Feb. 14, 1928.
R. H. HENDERSON
1,659,026
PIPE OR CONDUIT ELBOW FORMER
Filed May 27, 1926     2 Sheets-Sheet 1
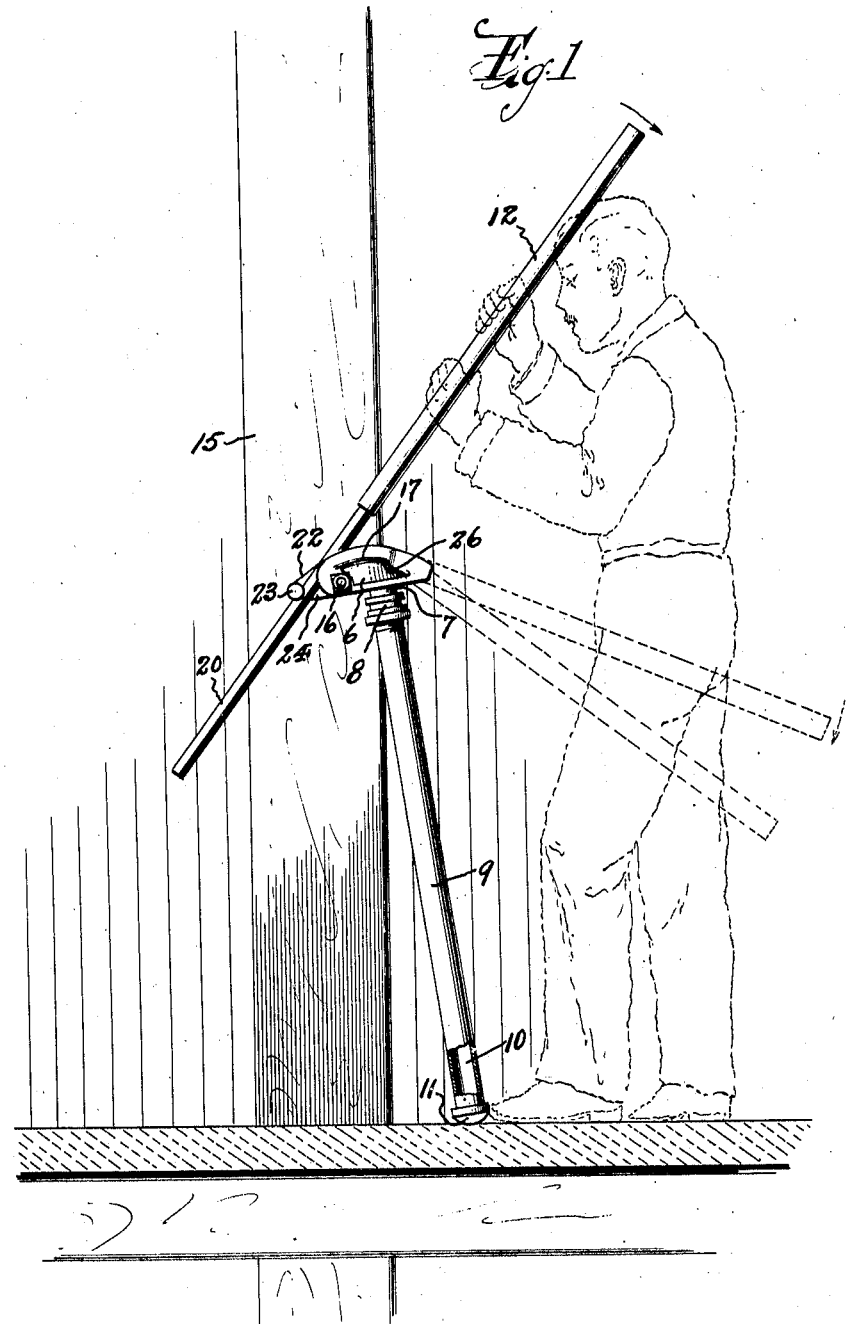
INVENTOR
Robert Halsey Henderson,
BY
Frautzel and Richards
ATTORNEYS

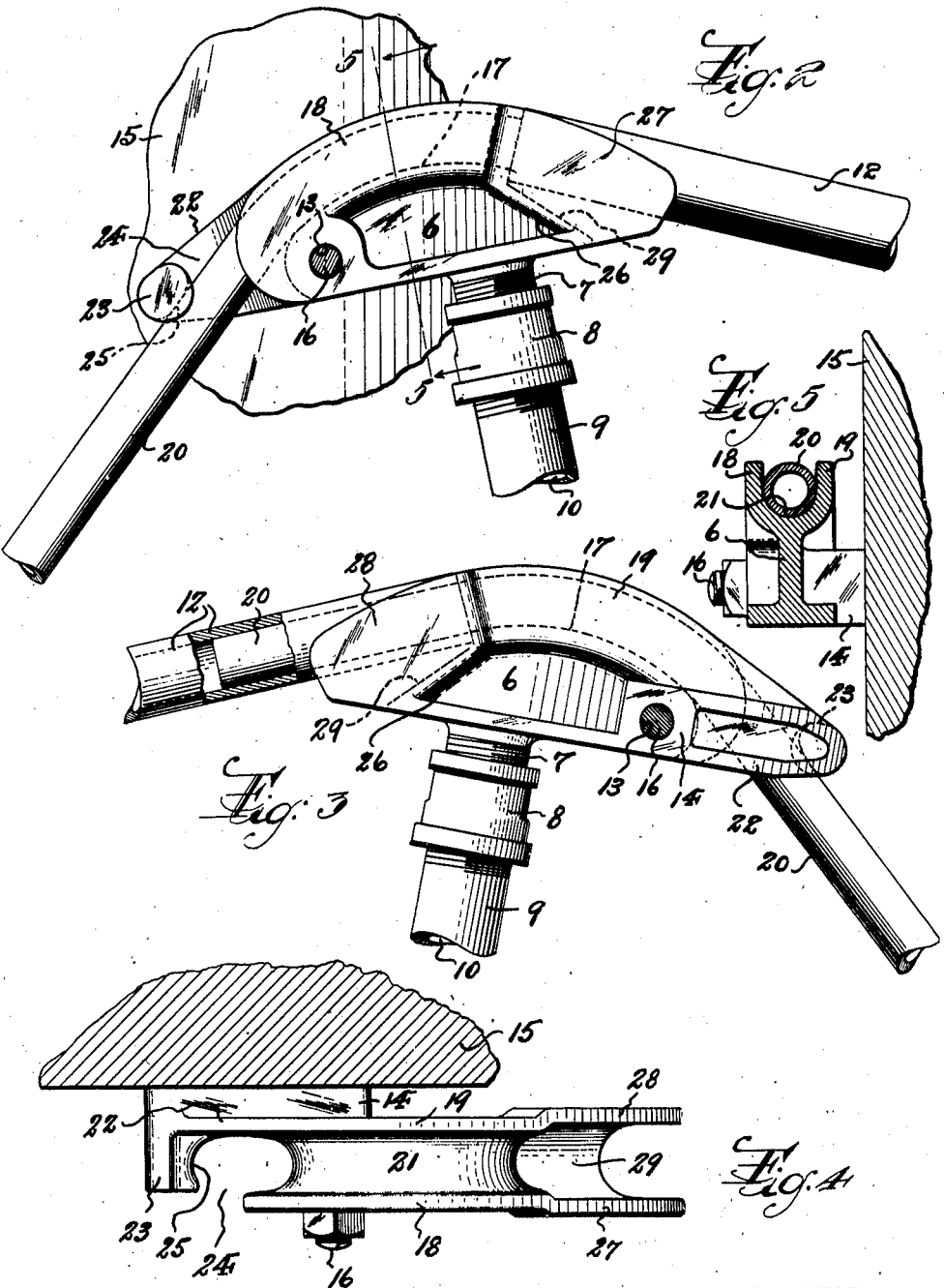

Patented Feb. 14, 1928.

1,659,026

UNITED STATES PATENT OFFICE.

ROBERT HALSEY HENDERSON, OF EAST ORANGE, NEW JERSEY.

PIPE OR CONDUIT ELBOW FORMER.

Application filed May 27, 1926. Serial No. 111,966.

This invention relates, generally, to pipe or conduit bending tools; and the same has reference, more particularly, to a novel construction of tool adapted more especially to form right angle bends or elbows in pipe or conduit.

This invention has for its principal object to provide a complete elbow-former tool in easily portable form, which may be quickly set up on the job, and which is adapted to function in producing true and accurate right angle bends or elbows in pipe or electric wire conduit, without the formation of kinks or other undesirable distortions, while at the same time providing a tool for such work which enables the operator to make the desired bends with a minimum of labor.

This invention has for a further object to provide an elbow former tool having in combination with its bending elements a positive stop which serves as a guide to the operator in determining the exact attainment of the desired right angle bend, without risk of either overbending or underbending.

The invention has for another object to provide a self-contained portable elbow forming tool having a hollow supporting leg provided at its free end with a detachable cap, so that when the tool is carried from job to job a pipe or conduit engaging handle, together with the fastener bolt for mounting the tool, may be enclosed within said hollow leg, thus assuring the keeping together of all the necessary parts for setting up and using the tool on the job to which it is carried.

Other objects of this invention, not at this time more particularly enumerated, will be clearly understood from the following detailed description of the same.

This invention is clearly illustrated in the accompanying drawings, in which:—

Figure 1 is a side elevation of the novel elbow former tool operatively set up for use, and illustrating the manner in which the operator utilizes the same in forming the desired right angle bends or elbows in pipe or conduit; Figure 2 is a fragmentary outer side elevation of the elbow former tool, drawn on an enlarged scale, and with a pipe or conduit as related thereto during the bending operation; Figure 3 is a similar view showing an inner side elevation of the elbow former tool; Figure 4 is a top end view of the same, and Figure 5 is a cross-section, taken on line 5—5 in Figure 2.

Similar characters of reference are employed in all of the hereinabove described views, to indicate corresponding parts.

Referring now to said drawings, the reference character 6 indicates the main body of the elbow former tool, the same being provided on its under side with an externally threaded shank 7. Coupled with said shank 7 by a switch intermediate coupling 8, or in any other suitable manner, is a supporting or staying leg 9, which preferably consists of a suitable length of iron pipe, adapted to provide a hollow interior 10. Connected with the lower free end of said leg 9, so as to be readily detachable therefrom at will, is a cap 11. When using the tool it is frequently desirable, especially when manipulating comparatively short lengths of pipe or conduit, to provide a tubular lever handle 12, which may be telescopically engaged over the end of the pipe or conduit to be manipulated to provide additional leverage when manipulating the latter, as well as to confine the bending stress within the operative zone of the tool. When the tool is demounted for carriage from job to job, said cap 11 is removed and the lever handle 12 may be thrust into the hollow interior 10 of the leg 9, and the cap replaced, thus assuring to the operator the possession of the convenient and proper lever handle wherever the tool may be carried and put into use.

The said main body 6 of the elbow former tool is provided, adjacent to its forward end, with a transverse opening 13, which also extends through an off-set boss 14 formed on the inner side of said main body 6. When it is desired to set up the tool on a job, any suitable stationary support, such as a column 15, may be selected against which the inner side of the main body 6 may be applied so as to be slightly off-set therefrom by the boss 14, whereupon a fastening bolt or lag screw 16 is passed through the opening 13 and column 15 or other support, to thereby secure the main body 6 to the latter. When the tool is dismounted for carriage to another job, the said bolt or lag screw 16 may also be inserted with the lever handle 12 within the hollow interior 10 of the leg 9. In applying the main body 6 to the supporting column 15, the same is arranged at such height from floor level, that its supporting or staying leg 9 may incline downwardly and rearwardly therefrom to said floor level, thus permitting the leg 9 to serve as a brace or stay in support of said main body 6, when pipe or conduit is assembled therewith for bending, all of which will be clearly evident from an inspection of Figure 1 of the drawings.

The upper side of said main body 6 is formed to provide a curved element 17 of a length substantially equivalent to one-fourth of the circumference of a circle having a radius corresponding to the radius of the bend it is desired to produce in the pipe or conduit in which an elbow is to be formed, said curved element thus providing the zone of bending operations. Bordering the sides of this curved element 17 are integral upstanding side flanges 18 and 19 which are spaced apart at a distance substantially equivalent to the diameter of a conduit or pipe 20 to be bent, to thus permit the latter to be seated between these flanges with a close fit, and whereby a deep groove 21 is formed, the depth of which exceeds the cross-sectional radius of the pipe or conduit to be bent, the cross-sectional curvature of the bottom of which groove conforms or corresponds substantially to the cross-sectional circumference of said pipe or conduit to be bent. The flange 19 possesses a forward extension 22 in the plane thereof, which terminates in a transverse post or abutment 23, which is spaced from the forward end of the curved element 17 far enough to permit the pipe or conduit 20 being passed sidewise through the space 24 which is left between the post or abutment and the forward end of the outer flange 18. The inner side of said post or abutment 23 is provided with a curved seat portion 25 substantially corresponding to the curvature of the cross-sectional circumference of the pipe or conduit to be bent.

Integrally formed in connection with the rearward end of said main body 6, and extending rearwardly from the rear end of its curved element 17, is a downwardly and rearwardly inclined stop element 26, bordering the sides of which are integral upstanding side flanges 27 and 28 which are spaced apart at a distance substantially equivalent to the diameter of the lever handle 12, to thus permit the latter to enter and be received therebetween, and whereby a stop-seat 29 is formed in alinement with and in rearward extension from the bending groove 21. The cross-sectional curvature of the bottom of said stop-seat 29 substantially conforms or corresponds to the cross-sectional circumference of said lever handle 12. Said stop-seat 29 thus provided is downwardly off-set from the bottom of the bending groove 21, at the point of juncture therewith, for a distance substantially corresponding to the thickness of the wall of said tubular lever handle 12. The rearward and downward inclination or oblique pitch of said stop-seat 29 is such that the angular relation thereof to the initial position of the pipe or conduit to be bent, when the latter is engaged between the post or abutment 23 and the forward end of the curved element 17, is slightly more than 90 degrees, such angular relation being so calculated that in operation the pipe or conduit may be bent slightly beyond the required right angle to allow for or compensate the inherent tendency of the pipe or conduit to reaction or "spring" when bending pressure is removed, so that although said stop-seat 29 is arranged and disposed to insure against either over-bending or under-bending the pipe or conduit, such reaction or "spring" of the same when bending pressure is removed is taken into account so as to assure upon completion of the bending operation the attainment of the accurate and true right angle elbow forming bend desired.

In operation, a straight length of pipe or conduit 20, in which it is desired to form a right angle bend or elbow, is passed sidewise through the space 24 to operatively position the same intermediate the post or abutment 23 and the forward end of the curved element 17 preparatory to bending (as shown by the full lines in Figure 1). In order to provide sufficient leverage to apply adequate bending pressure and to limit the bending stress to the portions of pipe or conduit in which the elbow is to be formed, the operator now telescopically applies over the rearwardly and upwardly extending end of the pipe or conduit 20, the tubular lever handle 12. By these simple and easy preparatory steps, without necessity for employing adjustable or other forms of mechanical clamps or auxiliary devices of any kind, the pipe or conduit is quickly made ready for the application of bending pressure. The operator, by grasping the lever handle 12 and swinging downwardly thereon with a single downward sweeping continuous motion, thereby applies the necessary pressure or force which quickly bends the pipe or conduit downwardly over the curved element 17, the operator continuing such downwardly applied bending pressure until the inner end of the lever handle 12 enters within and is brought to a stop by engagement with the stop-seat 29, he being on such occurrence assured that the properly true and accurate right angle elbow forming bend is attained. The inner end of the tubular lever handle 12 since it embraces the pipe being bent beyond the zone of bending operations as defined by the curved element 17 and since it is adapted to be arrested against movement by contact with the stop-seat 29, also prevents buckling or kinking of the pipe at points beyond said zone of bending operations. It will therefore be evident that the operator is not required to use any considerable care, or to exercise any skillful calculation to assure himself of the proper moment to stop the application of bending pressure in order to prevent either over-bending or under-bending, since the novel relation of the stop-seat element to the bending groove 21 provides him with a positive guide calculated to at once indicate the proper completion of the desired elbow forming bend. Such an arrangement is not only novel but is of decided advantage, since it permits of rapid and easy production of desired elbow forming bends without necessity of using especially skilled labor, thus permitting this work to be done by helpers or other unskilled labor at lower cost to the contractor.

In the production of the elbow forming bends in the general manner above described, the construction and relation of the bend forming elements of the device is such that all the advantages of automatic holding or gripping of the pipe or conduit, and its adequate support at every step of the bending operation against the occurrence of kinks or other undesired distortions is attained, since in their general character, construction and relation said bend forming elements function in a manner substantially similar to that fully described in my prior United States Letters Patent No. 1,379,016, dated May 24, 1921, in which is shown a pipe or conduit bender of general utility, as distinguished from the instant form of bender especially adapted for use as an elbow former.

It will be understood that the novel elbow former tool of the instant invention may be made in various sizes to respectively accommodate various sizes of pipe or conduit ranging from ¼ inch to 2 inches.

From the above description it will be quite apparent that I have provided by the instant invention a simple and yet highly efficient portable and self-contained elbow former tool, which is easily set up or demounted on the job, and which is highly efficient in operation. It will also be understood that the device may be utilized to produce double elbow or U-shaped bends such as return bends of 180 degrees, by shifting the pipe or conduit and repeating the above described bending operations.

I am aware that some changes may be made in the detailed construction of elbow former tool shown in the drawings and above described, without departing from the scope or spirit of this invention, and therefore, it is to be understood that the invention is not limited to the specific form or adaption herein described and shown except so far as such limitations are specified in the herefollowing claims.

I claim:—

1. A pipe or conduit elbow former, comprising a main body having means for supporting the same, a curved element to define the zone of bending operations formed at the upper side of said main body, said element having integral parallel side flanges providing with said element a peripheral groove substantially conforming in width to the diameter of the pipe or conduit to be bent and which where the bending operation occurs is deeper than the radius of said pipe whereby tendency of the latter to expand laterally under bending strains causes the same to be gripped between said side flanges to thereby prevent kinking or collapsing thereof, one of said flanges having a forwardly projecting extension provided with a transverse abutment post spaced outwardly from the forward end of said groove to provide an entrance gap between the former and the latter, a separable tubular lever handle for application to the pipe or conduit to be bent, and said main body having means providing a grooved stop-seat to fit and receive said lever handle to limit and arrest downward swinging movement thereof, said stop-seat being disposed to extend rearwardly from and beyond the rear end of said curved element and its peripheral groove.

2. A pipe or conduit elbow former, comprising a main body having means for supporting the same, a curved element formed at the upper side of said main body to define the zone of bending operations, said curved element having a radius approximating the radius of bend to be produced in a pipe or conduit and being of a length approximating one-fourth of the circumference of a circle of corresponding radius, said curved element having integral parallel side flanges forming therewith a peripheral groove substantially conforming in width to the diameter of the pipe or conduit to be bent and which where the bending operation occurs is deeper than the radius of said pipe or conduit whereby tendency of the latter to expand laterally under bending strains causes the same to be gripped between said side flanges to thereby prevent kinking or collapsing thereof, one of said flanges having a forwardly projecting extension provided with a transverse abutment post spaced outwardly from the forward end of said groove to provide an entrance gap between the former and the latter, a separable tubular lever handle for application to the pipe or conduit to be bent, and said main body having means providing a grooved stop-seat to fit and receive said lever handle to limit and arrest downward swinging movement thereof, said stop-seat being disposed to extend rearwardly from and beyond the rear end of said curved element and its peripheral groove.

3. In a pipe or conduit elbow former as specified in claim 2 in which the means for supporting the same comprises means to secure said main body to a stationary support above floor level, a stay-leg coupled with said main body, said stay-leg being adapted in operative position to extend in downward and rearward inclination from said main body to floor level.

4. A pipe or conduit elbow former, comprising a main body having means for supporting the same, said main body having a peripheral curved bending groove in its upper side bounded by parallel side flanges, one of said flanges having a forward extension provided with a transverse abutment post spaced outwardly from said groove to provide an entrance gap, a separable tubular lever handle telescopically slidable over the rearward end of the pipe or conduit to be bent, and said main body having at its rear end means providing a stop seat in alinement with said bending groove, said stop seat being adapted to receive the inner end of said lever handle to limit and arrest the downward movement thereof when applying thereby bending pressure to the pipe or conduit, and said stop seat being pitched at a downward and rearward angular relation to the initial position of the pipe to be bent slightly in excess of ninety degrees.

5. In a pipe or conduit elbow former as specified in claim 4 in which the means for supporting the same comprises means to secure said main body to a stationary support above floor level, a stay-leg coupled with said main body, said stay-leg being adapted in operative position to extend in downward and rearward inclination from said main body to floor level.

6. In a pipe or conduit bender, the combination with a main body having means to hold a pipe or conduit subject to bending operations, means against which the bend is formed, and means extending beyond the latter means adapted to limit the application of bending pressure; a separable tubular lever handle telescopically slidable over the rearward end of the pipe or conduit to be bent and adapted to cooperate with said means of the main body to limit the application of bending pressure; and means to support said main body in working position.

7. In a pipe or conduit bender, the combination with a main body having means to hold a pipe or conduit subject to bending operations, means against which the bend is formed, and means extending beyond the latter means adapted to limit the application of bending pressure; a separable tubular lever handle telescopically slidable over the rearward end of the pipe or conduit to be bent and adapted to cooperate with said means of the main body to limit the application of bending pressure; means to secure said main body to a stationary support above floor level; and a stay-leg coupled with said main body, said stay-leg being adapted in operative position to extend in downward and rearward inclination from said main body to floor level.

8. In a pipe or conduit bender, the combination with a main body having means to hold a pipe or conduit subject to bending operations, means against which the bend is formed, and means extending beyond the latter means adapted to limit the application of bending pressure; a separable tubular lever handle telescopically slidable over the rearward end of the pipe or conduit to be bent and adapted to cooperate with said means of the main body to limit the application of bending pressure; means to secure said main body to a stationary support, a tubular stay-leg providing a hollow interior chamber, means connecting the upper end of said stay-leg with said main body, and a detachable cap to close the lower end of said stay-leg, said hollow interior chamber of said stay-leg being adapted to receive and enclose said separable lever handle when not in use.

In testimony, that I claim the invention set forth above I have hereunto set my hand this 20th day of May, 1926.

ROBERT HALSEY HENDERSON.